United States Patent [19]
Ueno et al.

[11] 3,937,752
[45] Feb. 10, 1976

[54] HOMOPOLYAMIDE AND TERPOLYAMIDE BLEND

[75] Inventors: Hiroshi Ueno, Kawasaki; Tetsuo Tsukamoto, Higashirokugo, both of Japan

[73] Assignee: Toyo Seikan Kabushiki Kaisha, Tokyo, Japan

[22] Filed: Dec. 6, 1972

[21] Appl. No.: 312,651

Related U.S. Application Data

[63] Continuation-in-part of Ser. No. 13,892, Feb. 25, 1970, abandoned.

[30] Foreign Application Priority Data

Mar. 6, 1969   Japan.............................. 44-16463

[52] U.S. Cl.... 260/857 TW; 260/857 R; 260/857 F; 427/207; 427/370; 428/458
[51] Int. Cl.²......................................... C08L 77/00
[58] Field of Search...................... 260/857 TW, 78

[56] References Cited

UNITED STATES PATENTS 2,193,529   3/1940   Coffman...................... 260/857 TW
3,406,053   10/1968   Jaenicke...................... 260/857 TW

FOREIGN PATENTS OR APPLICATIONS 1,256,662   12/1971   United Kingdom......... 260/857 TW
2,010,497   10/1970   Germany..................... 260/857 TW

*Primary Examiner*—Murray Tillman
*Assistant Examiner*—J. Ziegler
*Attorney, Agent, or Firm*—Holman & Stern

[57] ABSTRACT

An adhesive composition for bonding together metal sheets in an extremely short time, which is an intimate mixture of (I) nylon 66, nylon 6, nylon 610, nylon 11 or nylon 12 and (II) a semicrystalline copolyamide such as a copolyamide of hexamethylene diammonium adipate, hexamethylene diammonium sebacate and 6-amino-caproic acid, in a ratio by weight of (I):(II) from 99:1 to 90:10.

6 Claims, 3 Drawing Figures

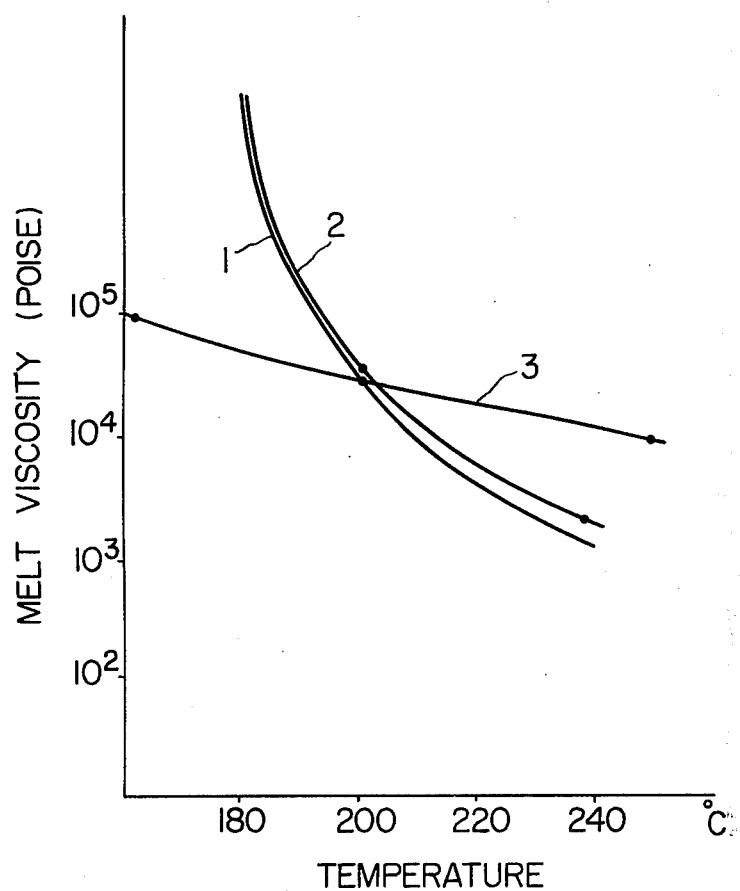

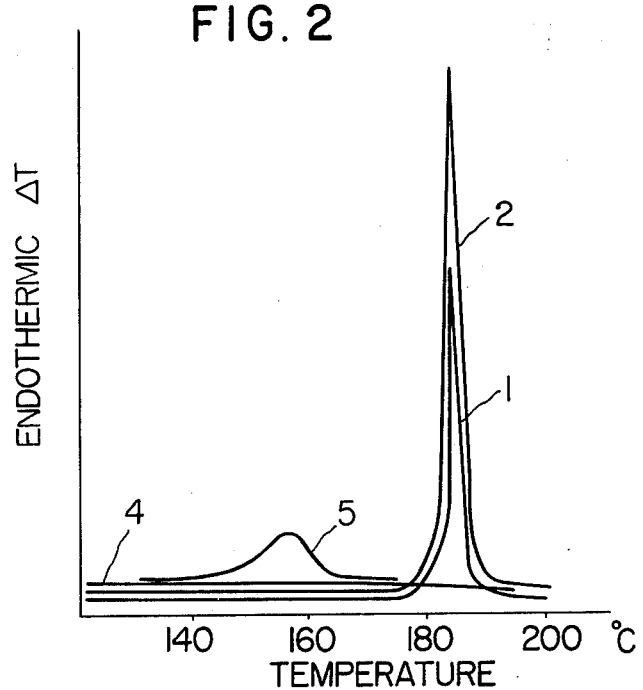
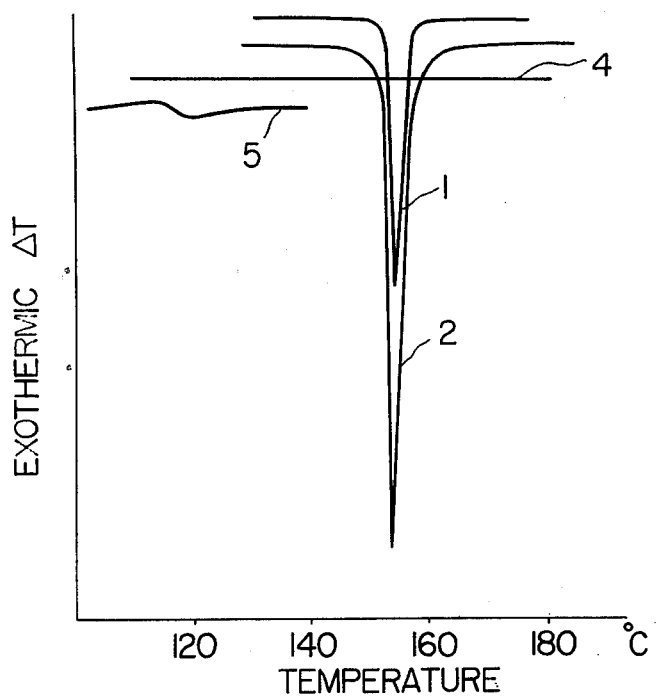

3,937,752

HOMOPOLYAMIDE AND TERPOLYAMIDE BLEND

CROSS REFERENCE TO THE RELATED APPLICATIONS

This application is a continuation-in-part of our copending application Ser. No. 13,892, filed Feb. 25, 1970, now abandoned.

BACKGROUND OF THE INVENTION

This invention relates generally to techniques in joining together metal sheets and to adhesives. More particularly, the invention relates to a new and improved adhesive for forming a strong lap joint in a very short time in the process of joining the surfaces of metal sheet to metal sheet by means of an organic adhesive.

The term "metal sheet" as used herein is intended to cover a wide variety of metal sheets, important examples of which are iron and steel sheets, aluminum sheets, sheets of other metals, these metal sheets plated over their surfaces with metals such as zinc, tin, chromium, and aluminium, metal sheets chemically or electrolytically treated with chromic acid or phosphoric acid and metal sheets coated over their surface with an organic paint.

Metal sheets of the above stated character can be securely joined by the metal-sheet adhesive of the invention, which adhesive is prepared by physically mixing a crystalline, linear homopolyamide and a semicrystalline copolyamide and is used directly or as a solution thereof in a suitable solvent, as described more fully hereinafter.

Linear polyamides are known for their high physical strength and extremely tough nature in comparison with other plastics, and are therefore used singly or in combinations with other substance as adhesives for bonding metals and other substances. Examples of these combinations are admixtures of linear polyamides with novolak type phenolic resins and the like (for example, as disclosed in Japanese Patent Publication No. SHO 36-20569), thermosetting type adhesives prepared by adding epoxy resins and other hardening accelerators to linear polyamides, adhesives comprising linear polyamides coated with epoxy resins or diisocyanates to be thermoset at the time of bonding (for example, as disclosed in Japanese Patent Publication Nos. SHO 35-4221 and SHO 36-15636), and copolymers produced by grafting to linear polyamides other components (for example, as disclosed in Japanese Patent Publication No. SHO 40-17662).

Adhesives produced by admixing novolak type phenolics with linear polyamides, however, are deficient in high-speed or quick adhesion property with respect to metal sheets. This deficiency is all the more pronounced in adhesives produced by changing the character of a polyamide and rendering it into a thermosetting resin, such resins requiring a long time for setting and therefore being unsuitable for quick-bonding uses. Furthermore, copolymers formed by grafting other components to linear polyamides entail high production costs and are therefore not practical at present.

In order to complete quick-bonding procedures in rapid manner, it is obviously necessary that the adhesive has, as one of its physical properties, good adhesion with respect to the articles to be bonded. As a result of our research on the solidification phenomenon occurring when adhesives are cooled from the molten state, we have discovered that, in addition to this good adhesiveness, a high temperature dependency of the melt viscosity of the adhesive and the fact that the adhesive is one of a crystalline high polymer are important conditions for quick-bonding procedures.

SUMMARY OF THE INVENTION

It is an object of the present invention to utilise the above stated discovery and other findings as set forth hereinafter to provide new quick-bonding adhesives for forming strong bonds between metal sheet surfaces in an extremely short time of the order of from 30 to 200 milliseconds, which adhesives are not accompanied by the above described difficulties encountered with known adhesives of the linear polyamide type.

Another object is to provide a method of producing and methods of using the adhesives according to the invention.

According to the present invention in one aspect thereof, briefly summarized, there is provided an adhesive composition for bonding together metal sheets prepared by physically mixing together a crystalline linear homopolyamide (1) of a relative viscosity of at least 1.5 when measured in a solution of 1 g of polymer in 100 CC of 98% sulphuric acid and a semicrystalline copolyamide (2) in a ratio by weight of from 99:1 to 90:10.

According to the present invention in another aspect thereof, there is provide a method of producing the adhesive composition of the invention.

In accordance with the present invention in still another aspect thereof, the adhesive prepared by physically mixing a crystalline linear homopolyamide and a semicrystalline copolyamide is applied directly as a coating by thermocompression bonding or by melt compression bonding, or in the form of a coating solution in a suitable solvent, onto parts of metal sheets to be bonded which have been cleaned to remove contaminants such as dust, oil, grease, and rust adhering thereto and is then dried, whereby an adhesive coating layer is formed on each part of the metal sheets to be bonded.

Each metal sheet part thus coated is placed in contact in lapped relation with a corresponding part thus coated, or not thus coated, of the counterpart metal sheet, and, as the parts thus in contact in lapped relation are heated and held at a temperature above the melting point of the crystalline linear homopolyamide in the adhesive, they are compressed together for a very short time of the order of from 30 to 200 milliseconds thereby to bond strongly one metal sheet to the other.

The nature, principles, details, and utility of the invention will be more clearly apparent from the following detailed description beginning with general considerations and concluding with specific examples of practice constituting preferred embodiments of the invention when read in conjunction with the accompanying drawing.

BRIEF DESCRIPTION OF THE DRAWING

In the drawings:

FIG. 1 is a graphical representation indicating the relationships between the melt viscosity and temperature respectively of an adhesive according to the invention, a crystalline linear homopolyamide, and a polyethylene;

FIG. 2 is a graphical representation indicating the variations of heat absorbed in melting with temperature respectively of an adhesive of the invention, a crystalline linear homopolyamide, an amorphous polyamide, and a semicrystalline copolyamide; and FIG. 3 is a graphical representation indicating the variations of heat evolved by crystallization with temperature respectively of an adhesive of the invention, a crystalline homopolyamide, an amorphous polyamide, and a semicrystalline copolyamide.

DETAILED DESCRIPTION

The aforementioned importance of high temperature dependency of the melt viscosity of the adhesive and the crystalline macromolecular character of the adhesive will be more fully apparent from the following description with respect to an example of a metal sheet to metal sheet bonding process with an organic adhesive.

First the adhesive is heated and melted at a temperature above its melting point and is then caused to adhere to a metal sheet surface to be bonded. Alternatively, the metal sheet is heated to a temperature above the melting point of the adhesive, and the adhesive in solid state is caused to contact the metal sheet thus heated and thereby to be melted and to adhere to the metal plate to form an adhesive coating layer.

Next, the part of the metal sheet thus coated with the adhesive is placed in contact in lapped relation with a corresponding part similarly coated or not coated with adhesive of another counterpart metla sheet to which the first metal sheet is to be bonded. The parts thus placed in lapped contact are then heated to a temperature above the melting point of the adhesive thereby to melt the adhesive layer on both sheets or one of the sheets and compressed together for a very short time, being then cooled to a temperature below the crystallization temperature of the adhesive, the two metal sheets being thus bonded together.

In order to complete bonding of metal sheets in a very short time by a method in which such a heating, adhesion, and cooling process is utilized, each of these process steps must be carried out in a very short time as, for example, from 30 to 200 milliseconds.

Certain points relating to these process steps and the physical properties required of the adhesive will now be considered. In the step of heating the adhesive to a temperature above its melting point to melt the same and cause its adhesion to a metal surface, the lower the melt viscosity of the adhesive is, the better will the adhesive bonding step be carried out. Furthermore, since the melt viscosity of the adhesive decreases with increasing heating temperature, it is possible to lower the melt viscosity of the adhesive by increasing the heating temperature. However, since the metal sheet of high thermal conductivity is also heated to a high temperature at the same time, cooling requires a considerable time, and as a result the entire adhesion bonding process requires a long time and, therefore, becomes disadvantageous for quick bonding.

Therefore, for accomplishing quick bonding, it is desirable that the melt viscosity characteristic of the adhesive with respect to temperature be such that the melt viscosity varies greatly for a slight variation in temperature above the melting point of the adhesive.

More specifically, it is desirable that, in the process of quick bonding by melting of the adhesive, the melt viscosity decreases abruptly for a slight rise in temperature and that, upon completion of bonding, the melt viscosity rises abruptly for a slight decrease in temperature. By using an adhesive having such a melt viscosity characteristic, the bonding process can be carried out with relatively low quantity of power for heating and cooling, whereby such an adhesive is advantageous for quick bonding.

Unless an adhesive acquires an adhesive strength above a certain level immediately after cooling, there will be a possibility of the joined parts which have been caused once to adhere to each other separating in the succeeding process. For example, when an amorphous or semicrystalline high-polymer adhesive is used, the adhesive after compression adhesion and cooling tends to remain in a semimolten state and requires time to solidify, and time is required for the adhesive strength to become amply high, whereby high-speed or quick bonding is not possible.

A crystalline high-polymer material, however, solidifies from the molten state, and its crystallization progresses immediately at a temperature below its crystallization temperature, whereby it exhibits a mechanically tough characteristic. Accordingly, for quick bonding, the adhesive is required not only to have a high temperature dependency of melt viscosity but also to be a crystalline high polymer which crystallizes and exhibits high adhesive strength immediately after adhesion and cooling.

Because of their properties such as excellent metal adhesion, high temperture dependency of melt viscosity, and crystalline macromolecular nature, crystalline linear homopolyamides can be considered to be suitable for use in quick bonding.

When a crystalline linear homopolyamide is utilized singly for an adhesive, the proportion of the crystal portion thereof (i.e., degree of crystallization) has a great influence on the quick bonding process. More specifically, the smaller the proportion of the polyamide crystalline portion is, the more advantageous is the adhesive in carrying out in a short time the step of heating the adhesive to a temperature above its melting point until it assume a molten state. Therefore, a low degree of crystallization of the adhesive makes possible its melting in a short time.

When a semicrystalline copolyamide is used as an adhesive, it is advantageous for heating and melting in a short time since heat for melting a crystal portion is not necessary. However, crystallization after adhesion and cooling does not progress rapidly, and excessive time is required for attainment of sufficient adhesive strength, whereby quick bonding with such polyamides is not possible.

While it is possible, of course, even in the case of an adhesive of high degree of crystallization, to melt the adhesive in a short time by applying a large quantity of heat thereto, the metal sheets are also heated to a high temperature in this case and require much time to cool, whereby a long time is required for the entire adhesive bonding process.

That is, when quick bonding is carried out by utilizing the process steps of heating, melting, adhesion, and cooling of the adhesive, the adhesive must be a crystalline high polymer for promotion of the solidification thereof in the cooling step, but if the degree of crystallization is too high, an excessively long time will be required for heating and melting. Therefore, control of the degree of crystallization of the adhesive is an important factor in quick bonding.

We have found that it is possible to control the degree of crystallization of a crystalline linear homopolyamide by physically blending the crystalline linear polyamide with a semicrystalline copolyamide in a ratio by weight of from 99:1 to 90:10 thereby to produce an adhesive which has excellent adhesiveness with respect to metal sheets and its optimally suitable for use in quick bonding without losing its high temperature dependency of melt viscosity, which is a unique characteristic of linear homopolyamides.

Various properties of physical mixtures of crystalline linear homopolyamides and semicrystalline copolyamides will now be described with reference to FIGS. 1, 2, and 3.

In FIG. 1 the ordinate represents viscosity (poise), while thee abscissa represents temperature. Curve 1 represents variation of melt viscosity with temperature in an adhesive according to the invention, and curves 2 and 3 respectively indicate similar relationships in a crystalline linear polyamide and in an example of a resin such as a polyethylene.

As is apparent from FIG. 1, the temperature dependencies of melt viscosity of the adhesive (curve 1) according to the invention and of the crystalline linear homopolyamide (curve 2) are remarkably higher than that of the polyethylene (curve 3), which is a representative example of other plastics. Furthermore, while the temperature dependency of melt viscosity of the adhesive of the invention is substantially the same as that of the crystalline homopolyamide, the values of melt viscosity are lower than those of the crystalline homopolyamide.

FIG. 2 shows relationships between heat absorption accompanying melting and temperature and indicates the behaviours of melting of samples respectively of an adhesive of the invention (curve 1), a crystalline linear homopolyamide (curve 2), an amorphous polyamide (curve 4), and a semicrystalline copolyamide (curve 5) were heated with a certain constant temperature rise rate.

As is apparent from FIG. 2, in the case of the adhesive (curve 1) of the invention and that of the crystalline homopolyamide (curve 2), sharp peaks due to heat absorption at the time of crystal melting are indicated in a certain temperature range determined by the kind of crystalline homopolyamide. The term "melting point" as used herein is defined as that temperature at which the melting heat exhibits a peak value. Since there is no crystal portion in an amorphous polyamide (curve 4), no heat absorption peak due to melting of crystals is observable. In the case of the semicrystalline copolyamide (curve 5), only a slight heat absorption due to melting is observable at a temperature lower than that of the peaks of the crystalline linear homopolyamide (curve 2) and the adhesive curve 1) of the invention. Thus, these curves in FIG. 2 indicate the differences in the melting phenomena of crystalline linear homopolyamides, amorphous polyamides, and semicrystalline copolyamides.

It is also observable in FIG. 2 that, while there is no appreciable difference in the temperatures at which melting heat peaks are indicated, i.e., melting points, of the adhesive (curve 1) of the invention and of the crystalline linear homopolyamide (curve 2), the peak area (or area under the peaked part of the curve 1) of the adhesive of the invention is smaller. This indicates that the degree of crystallisation of the adhesive of the invention is lower than that of the crystalline linear homopolyamide which is the basic material and that the quantity of heat needed for melting of the crystals is lower for the adhesive of the invention. Thus, on this point the adhesive of the invention is advantageous over the basic crystalline linear polyamide used singly for quick melting and bonding.

The crystallization behavior of each of samples of an adhesive according to the invention (curve 1), a crystalline linear homopolyamide (curve 2), a semicrystalline copolyamide (curve 5), and an amorphous polyamide (curve 4) when cooled from the molten state is indicated in FIG. 3.

As is apparent from this FIG. 3, the adhesive of the invention (curve 1) and the crystalline linear polyamide (curve 2) exhibit sharp peaks of heat generated by their crystallization to solidify. The amorphous polyamide (curve 4) does not evolve heat due to crystallization, while only a slight quantity of head evolution due to crystallization is observable in the case of the semicrystalline copolyamide (curve 5), and a rapid setting phenomenon does not occur in this case. Thus, the remarkable difference between the crystallization behaviour of the adhesive of the invention and that of an amorphous or semicrystalline copolyamide is clearly indicated.

When an adhesive according to the invention is once melted and cooled, the melt viscosity thereof rises abruptly with the cooling, whereby the adhesive solidifies, and crystallization progresses rapidly at a certain temperature. The resulting adhesive thereupon exhibits high physical strength.

In the case where heating, melting, adhesion, and cooling process steps are utilised, and, moreover, quick bonding is to be accomplished, the important requisites are, first, that the temperature dependency of the melt viscosity of the adhesive be high and, second, that the adhesive be a crystalline high polymer, as stated hereinbefore. In addition, it is necessary to accomplish melting with a small quantity of heat and, moreover, cause crystallization to progress rapidly in the cooling step, whereby control of the degree of crystallization becomes a most important requirement.

By using an adhesive according to the invention, all of these requirements can be satisfied, and when metal sheets are bonded with such an adhesive, each of the steps of heating, adhesion, and cooling can all be carried out in a short time of the order of from 30 to 200 milli-second, and a strong joint or bond can be formed between the metal sheets.

More specifically, by subjecting a film of an adhesive according to the invention to a short-time compression adhesion, for example, in 200 milliseconds, on metal sheets heated to a temperature above the melting point of the adhesive, it is possible to prepare adhesive-coated metal sheets to which the adhesive-coating is strongly adhering. Then, by heating these coated metal sheets again to a temperature above the melting point of the adhesive and pressing together and cooling the surfaces to be bonded, which are thus coated with molten adhesive, in a very short time, for example, of the order of 50 milliseconds, metal sheets secured together by a strongly bonded joint can be obtained.

Thus, bonded joints can be formed in a very short time by the bonding method wherein an adhesive of the invention is used, whereby this method can be used to replace the conventional solder-joint method in forming side seam joints of cans or containers made of metal sheets. Accordingly, such a bonding method using adhesive according to the invention can be advantageously applied to a high-speed production such as automatic can manufacturing.

The compositions of adhesives suitable for use in accordance with the present invention will now be considered. Examples of crystalline linear homopolyamides, constituting one constituent of the adhesive of the invention, which we have found to be suitable are nylon 66 (polyhexamethylene adipamide), nylon 6 (poly ε-caprolactam), nylon 610 (polyhexamethylene sebacamide), nylon 11 (poly ω-undecamide), and nylon 12 (poly ω-dodecamide), which are generally available on the market.

Examples of semicrystalline copolyamides, constituting another constituent of the adhesive, which we have found to be suitable are copolyamides of at least two substances such as alkylene (e.g. $C_4$–$C_{14}$) diamine such as hexamethylenediamine, alkylene dicarboxylic acid (e.g. $C_4$–$C_{14}$) such as adipic acid, or sebacic acid, aminocarboxylic acid (e.g. $C_4$–$C_{14}$) such as 6-aminocaproic acid, 11-amino-undecanoic acid, or 12-aminolauric acid.

Copolyamides (nylons) which are semicrystalline copolyamides are sold on the market under trademark names such as AMILAN CM 4000 and CM 4001 of the Toyo Rayon Company, Japan and ELVAMIDE of the E. I. Du Pont De Nemours & Company, Inc., U.S.A. The AMILANS are copolyamides of 6-aminocaproic acid, hexamethylene diamine, adipic acid and sebacic acid. AMILAN CM 4,000 is a copolyamide of 40% by weight of 6-amino caproic acid, 35% by weight of hexamethylene diamine adipate and 25% by weight of hexamethylene diamine sebacate and has a relative viscosity of 2.65 when measured in a solution of 1 g polymer in 100 cc of 98% sulfuric acid at 20°C while AMILAN CM 4,001 is a copolyamide of 30%, 40% and 30%, respectively of the same ingredients, and has a relative viscosity of 2.72. ELVAMIDE is a copolyamide of the same monomers as the AMILANS but with proportions of 46%, 27% and 27%, respectively, and a relative viscosity of 2.65 as similar measured in sulphuric acid.

While a crystalline linear homopolyamide, constituting one constituent of the adhesive, which has a relative viscosity in 98-percent sulphuric acid of less than 1.5 (relative viscosity measured in a solution of 1 g polymer in 100 cc of 98% sulfuric acid at 20°C) can be used for bonding, it has not been possible to obtain strong bonding strength because of the brittle character of the crystalline linear homopolyamide itself. It is preferable that the semicrystalline copolyamides, too, have a relative viscosity of at least 1.5.

The crystalline linear homopolyamide and the semicrystalline copolyamide can be physically mixed to form the adhesive of the invention by any of several methods. Examples of these methods are the solvent admixing method wherein a solvent in which both substances are highly soluble is used, the heated-roll kneading admixing method carried out in a stream of nitrogen, and the heat kneading method in which a screw-type extruder is used, of which the last mentioned method of admixing by means of a screw-type extruder is the most economical.

Results of tests relating to the composition and degree of crystallization, melt viscosity, melting point, temperature of crystallization, and adhesive bond strength due to quick bonding are indicated in Table 1 and 2.

In the preparation of the samples of adhesives for these tests, the crystalline linear homopolyamides and the semicrystalline copolyamides were mixed in solid state in various proportions and heated and kneaded by means of an extruder provided with a nylon type screw of 40-mm. diameter and 1,120-mm effective length. The principal heating and kneading conditions were a temperature of from 200° to 230°C at the die part and a screw rotational speed of 30 rpm.

Pellets of the adhesive thus heated and kneaded were rendered into a film of 50-micron thickness by means of a film forming apparatus comprising an extruder provided with a nylon type screw of 25-mm diameter and 600-mm effective length and a T die of an extrusion or casting aperture of 0.3-mm width and 10-mm length mounted thereon. The principal heating and extruding conditions were a temperature at the die part of from 200° to 230°C and a screw rotational speed of 40 rpm.

Polyamides are rather hydrophillic and the pellets or the adhesives are preferably dried in order to reduce water content thereof to, for example, less that 1% thereby to prevent possible blistering due to the evaporation of adsorbed water during the high speed bonding.

The metal sheets used in these tests were metal sheets prepared by roll coating a phenolic lacquer to a film thickness of 5 microns on Hi-Top (a Trade Mark for electrolytically-chromium treated steel sheets manufactured by the Toyo Kohan Company, Japan) and baking the lacquer thus coated at 210°C for 10 minutes in a baking oven.

The metal sheets thus painted were bonded by heating parts thereof to be bonded to a temperature of approximately 230° to 250°C, pressing thereon and cooling during 200 milliseconds pieces of the aforementioned 50-micron adhesive film, heating the surfaces of the metal sheets thus coated with the adhesive to a temperature of approximately 230° to 250°C, and then pressing together and cooling during 50 milliseconds the metal sheets with their respective adhesive film surfaces in mutual contact. In this manner the test samples or specimens were prepared.

Table 1

| CRYSTALLINE HOMOPOLYAMIDE | SEMICRYST COPOLYAMIDE | MELTING POINT (°C) | CRYSTALLIZATION TEMP. (°C) | MELT VISCOSITY (poise) *4 | DEGREE OF CRYSTALLISATION (count) *5 | SHEAR STRENGTH (kg/cm²) *6 |
|---|---|---|---|---|---|---|
| Nylon 12 only *1 | — | 184 | 154 | 15,500 | 400 | 230 |
| Nylon 12 | Semicrystalline copolyamide *7 | 182 | 158 | 14,000 | 200 | 330 |
| Nylon 12 | Semicrystal- | | | | | |

Table 1-continued

| CRYSTALLINE HOMOPOLYAMIDE | SEMICRYST COPOLYAMIDE | MELTING POINT (°C) | CRYSTALLIZATION TEMP. (°C) | MELT VISCOSITY (poise) *4 | DEGREE OF CRYSTALLISATION (count) *5 | SHEAR STRENGTH (kg/cm²) *6 |
|---|---|---|---|---|---|---|
| | line copolyamide *8 | 183 | 152 | 13,000 | 230 | 300 |
| Nylon 11 only *2 | — | 193 | 165 | 18,000 | 450 | 210 |
| Nylon 610 only *3 | — | 225 | 196 | 3,900 | 430 | 190 |
| Nylon 610 | Semicrystalline copolyamide *7 | 225 | 195 | 4,000 | 160 | 275 |

*1 Relative viscosity in 98% $H_2SO_4$ : 2.45
*2 Relative viscosity in 98% $H_2SO_4$ : 2.6
*3 Relative viscosity in 98% $H_2SO_4$ : 2.7
*4 Apparent viscosity by using a flow tester (nylon 12, nylon 11 measurements at 220°C, nylon 610 measurements at 240°C).

*5 Reflection count during 1 second in incident angle for maximum diffracted X-ray strength with 30-KV tube voltage and 30-mA tube current with the use of an X-ray diffraction instrument manufactured by the Rigaku Denki Company, Japan. Test sample was 50-micron film, and sample reflection area was 3-mm × 20-mm.
*6 Bond area 3-mm × 20-mm; converted to kg/cm² after shear strength measurement (cross head speed 100 mm/min.).
*7 A copolyamide of 30% by weight of 6-amino-caproic acid, 40% by weight of hexamethylene diammonium adipate and 30% by weight of hexamethylene diammonium sebacate having a relative viscosity of 2.72.
*8 A copolyamide of 46% by weight of 6-amino-caproic acid, 27% by weight of hexamethylene diammonium adipate and 27% by weight of hexamethylene diammonium sebacate having a relative viscosity of 2.65.
Note: The mixture ratio by weight of the crystalline homopolyamide and the semicrystalline copolyamide in each of the above mixtures was 95:5.

Table 2

| CRYSTALLINE HOMOPOLYAMIDE (parts) | SEMICRYST COPOLYAMIDE (parts) | MELTING POINT (°C) | CRYSTALLIZATION TEMP. (°C) | MELT VISCOSITY (poise) | DEGREE OF CRYSTALLIZATION (count) | SHEAR STRENGTH (kg/cm²) |
|---|---|---|---|---|---|---|
| Nylon 12 only | | 184 | 154 | 15,500 | 400 | 230 |
| Nylon 12 (99) | Semicrystalline copolyamide *1 (1) | 183 | 154 | 15,500 | 280 | 290 |
| Nylon 12 (97) | Semicrystalline copolyamide *1 (3) | 182 | 154 | 15,500 | 240 | 300 |
| Nylon 12 (95) | Semicrystalline copolyamide *1 (5) | 182 | 153 | 15,500 | 190 | 320 |
| Nylon 12 (90) | Semicrystalline copolyamide *1 (10) | 180 | 153 | 14,500 | 150 | 290 |
| Nylon 12 (80) | Semicrystalline copolyamide *1 (20) | 180 | 153 | 14,400 | 110 | 210 |

*1 A copolyamide of 40% by weight of 6-amino-caproic acid, 35% by weight of hexamethylene diammonium adipate and 25% by weight of hexamethylene diammonium sebacate having a relative viscosity of 2.65.

As is apparent from Table 1, the melting points, crystallization temperatures, and melt viscosities of the adhesives prepared by physically mixing a crystalline linear homopolyamide and a semicrystalline copolyamide do not differ greatly from those of the crystalline polyamide, but the degrees of crystallization of these adhesives are lower, and their quick-bonding strengths are remarkably higher.

While the degree of crystallization is ordinarily determined from a measurement of specific gravity, such a determination cannot be made with respect to substances such as those examined in the instant tests which are mixtures of two substances of respectively different specific gravities. Therefore, we have taken diffracted X-ray strength, which has a direct relation to degree of crystallization, as an indication of the degree of crystallization. A higher value of diffracted X-ray strength indicates a higher degree of crystallization, but this indication, of course, is merely a relative quantity.

The incident angle producing maximum magnitude of diffracted X-ray strength was 10.7° for nylon 12 and 10.6° for nylon 11.

Various adhesives were prepared by mixing crystalline linear homopolyamides and semicrystalline copolyamides in various proportions, and the physical properties and quick-bonding strengths of the resulting adhesives were measured. Examples of the results thus obtained are set forth in Table 2.

The results of these tests indicate that the adhesive strength of the adhesive is maximum with a weight ratio of the crystalline linear homopolyamide and semicrystalline copolyamide of approximately 95:5, and the range of this ratio for high values of the adhesive strength is from 99:1 to 90:10. While the melt viscosity and the degree of crystallization decreases when the weight proportion of the crystalline linear homopolyamide becomes less than 80%, the crystallization of the adhesive in the cooling step after quick adhesion cannot progress, whereby the quick-bonding property of such an adhesive becomes poor.

In order to indicate still more fully the nature and utility of the inventon, the following examples of practice, including production of the adhesive, application and adhesion bonding therewith, and adhesive strength, constituting preferred embodiments of the invention are set forth, it being understood that these examples are presented as illustrative only and are not intended to limit the scope of the invention.

EXAMPLE 94 parts of nylon 12 (relative viscosity 2.65 measured in a solution of 1 g polymer in 100 cc of 98%, sulfuric acid at 20°C) constituting a crystalline linear homopolyamide and 6 parts of a copolyamide of 40% by weight of 6-amino-caproic acid, 35% by weight of hexamethylene diammonium adipate and 25% by weight of hexamethylene diammonium sebacate having a relative viscosity of 2.65 constituting a semicrystalline copolyamide were mixed in their solid state and were heat kneaded by means of an extruder provided with a nylon type screw of 40-mm diameter and 1,120-mm effective length. The heat kneading conditions were a die temperture of 200°C and a screw rotational speed of 30 rpm.

Pellets of the adhesive heat kneaded in this manner were rendered into a 50-micro-thick film by means of a film-forming apparatus comprising an extruder having a nylon type screw of 25-mm diameter and 600-mm effective length and a Tee die of 0.3-mm width and 10-mm length mounted on the extruder. The conditions of this extrusion step were a die temperature of 200°C and a screw rotation speed of 40 rpm.

Next surfaces to be bonded of various metal sheets to be joined as set forth in Table 3 were heated to approximately 230°C and covered with strips of 3-mm width of the adhesive film prepared in the above described manner and caused to adhere thereon by pressing and cooling in 200 milliseconds.

Each bonding surface thus coated with the adhesive was then heated again to approximately 230°C and thereafter lap-jointed to the counterpart surface by pressing and cooling during approximately 70 milliseconds. The adhesive strengths (shear strengths in $kg/cm^2$) of the joints thus produced and those of joints formed with nylon 12 used singly for bonding the same metal sheets are set forth in Table 3.

The principal physical properties of the adhesive prepared in the above described manner were a melting point of 182°C, a crystallization temperature of 152°C, a melt viscosity at 220°C of 18,000 poise, and a diffracted X-ray strength of 175 counts/second.

Table 3

| METAL SHEET BONDED | SHEAR STRENGTH ($kg/cm^2$) | |
| --- | --- | --- |
|  | Adhesive of the invention | Nylon 12 only |
| Steel sheet | 230 | 185 |
| Tin-plated sheet | 180 | 105 |
| Tin-plated sheet, coated with phenolic paint | 280 | 200 |
| Aluminum sheet | 150 | 100 |
| Sheet treated with chromic acid | 260 | 210 |
| Sheet treated with chromic acid and coated with phenolic paint | 330 | 230 |

What we claim is:

1. An adhesive composition for bonding together metal sheets, said composition being a homogeneous blend consisting essentially of:
   I. a crystalline linear homopolyamide selected from the group consisting of polyhexamethylene adipamide, poly ε-caprolactam, polyhexamethylene sebacamide, poly ω-undecamide, and poly ω-dodecamide, of a relative viscosity of at least 1.5 when measured in a solution of 1 g polymer in 100CC of 98% sulphuric acid at 20°C and
   II. a copolyamide of at least three members selected from the group consisting of alkylene diammonium carboxylates of alkylene diamines having 4 to 14 carbon atoms and alkylene dicarboxylic acids having 4 to 14 carbon atoms, and alkylene amino carboxylic acids having 4 to 14 carbon atoms,
   in a ratio by weight of (I): (II) from 99:1 to 90:10.

2. An adhesive composition for bonding together metal sheets according to claim 1, wherein (II) is a copolyamide of at least three members selected from the group consisting of hexamethylene diammonium adipate, hexamethylene diammonium sebacate, 6-amino-caproic acid, 11-amino-undecanoic acid and 12-amino-lauric acid.

3. An adhesive composition for bonding together metal sheets, said composition being a homogeneous blend consisting essentially of:
   I. a crystalline linear polyamide selected from the group consisting of polyhexamethylene sebacamide, poly ω-undecamide and poly ω-dodecamide, of a relative viscosity of at least 1.5 when measured in a solution of 1 g polymer in 100CC of 99% sulphuric acid and
   II. a copolyamide of three members hexamethylene diammonium adipate, hexamethylene diammonium sebacate, and 6-amino-caproic acid, in a ratio by weight of (I):(II) from 99:1 to 90:10.

4. An adhesive composition for bonding together metal sheets as claimed in claim 3 in which said crystalline homopolyamide is poly ω-dodecamide and said copolyamide is a copolyamide of apploximately 30% by weight of 6-amino-caproic acid, approximately 40% by weight of hexamethylene diammonium adipate and approximately 30% by weight of hexamethylene diammonium sebacate.

5. An adhesive composition for bonding together metal sheets as claimed in claim 3 in which said crystalline homopolyamide is poly ω-dodecamide, and said copolyamide is a copolyamide of approximately 46% by weight of 6-amino-caproic acid, approximately 27% by weight of hexamethylene diammonium adipate and approximately 27% by weight of hexamethylene diammonium sebacate.

6. An adhesive composition for bonding together metal sheets as claimed in claim 3 in which said crystalline homopolyamide is polyhexamethylene sebacamide and said copolyamide is a copolymer of approximately 30% by weight of 6-amino-caproic acid, approximately 40% by weight of hexamethylene diammonium adipate and approximately 30% by weight of hexamethylene diammonium sebacate.

* * * * *